United States Patent [19]

Brewer et al.

[11] 4,166,809

[45] Sep. 4, 1979

[54] CELLULOSE PROPIONATE N-BUTYRATE AND COATING COMPOSITIONS CONTAINING SAME

[75] Inventors: Richard J. Brewer; Willis C. Wooten, Jr., both of Kingsport, Tenn.

[73] Assignee: Eastman Kodak Company, Rochester, N.Y.

[21] Appl. No.: 863,197

[22] Filed: Dec. 22, 1977

[51] Int. Cl.$^2$ .................................................. C08L 1/14
[52] U.S. Cl. ........................................ 260/16; 260/15; 536/64; 536/65; 536/68; 428/481; 428/482; 428/528; 428/535
[58] Field of Search ...................... 260/16; 536/64, 65

[56] References Cited

U.S. PATENT DOCUMENTS

| | | | |
|---|---|---|---|
| 2,026,583 | 1/1936 | Malm et al. | 536/65 |
| 2,147,697 | 2/1939 | Gloor | 260/16 |
| 3,370,025 | 2/1968 | Salo et al. | 536/65 |
| 3,622,362 | 11/1971 | Coney et al. | 536/68 |

FOREIGN PATENT DOCUMENTS

| | | | |
|---|---|---|---|
| 321575 | 11/1929 | United Kingdom | 536/65 |
| 419763 | 11/1934 | United Kingdom | 536/65 |

*Primary Examiner*—Edward M. Woodberry
*Attorney, Agent, or Firm*—John F. Stevens; Daniel B. Reece, III

[57] ABSTRACT

Cellulose propionate n-butyrate adapted to be mixed with an oil-modified alkyd resin to form a coating composition. The cellulose propionate n-butyrate has unique properties as an ingredient in such coating composition. The cellulose ester has a n-butyryl content of between about 3% and about 5%, a propionyl content of between about 40% and about 50% and a hydroxyl content of between about 2% and about 3%. The coating compositions are especially useful for protection and appearance when used as a coating on such items as wooden furniture.

6 Claims, No Drawings

CELLULOSE PROPIONATE N-BUTYRATE AND COATING COMPOSITIONS CONTAINING SAME

The present invention relates to cellulose propionate n-butyrate and to coating compositions containing same. More specifically, this invention relates to such cellulose ester and to mixtures thereof with oil-modified alkyd resins useful for coating substrates for protection and appearance. These compositions are especially useful for coating such items as wooden furniture.

Oil-modified alkyd resins have been used in the past as principal ingredients in the film-forming components of lacquers. The nonrigid nature of vegetable oil alkyd resins necessitates the use of another component to provide hardness and rigidity. Cellulose nitrate is frequently used for this purpose and in combination with the alkyd resin provides coatings having excellent clarity and high aesthetic appeal, adequate hardness, adhesion, toughness and durability. Problems have been experienced, however, in using combinations of organic cellulose esters and oil-modified alkyd resins because physical properties of clarity, adhesion, hardness and sandability have been difficult to attain in combination. Obtaining satisfactory clarity in the coating has been a significant problem with cellulose ester-alkyd coatings.

It would be very desirable to use organic cellulose esters rather than cellulose nitrates in many coating compositions for several reasons. When an organic cellulose ester is used in an oil-modified alkyd resin coating composition rather than cellulose nitrate, much greater coverage of the coating composition is obtained. Also, coatings containing cellulose nitrate tend to crack in extremely cold temperatures and possess some initial color which may be carried over into the coating film. Organic cellulose ester coatings are less brittle, and have better color stability when subjected to ultraviolet light than coating compositions containing cellulose nitrate. In addition, the cellulose propionate n-butyrates used in accordance with this invention have greatly improved clarity.

The present invention provides cellulose propionate n-butyrate and coating compositions containing same with oil-modified alkyd resins having good physical properties such as clarity, hardness, adhesion and sandability.

Various cellulose esters are known in the art to be useful in coating compositions. Defensive Publication T959,007, dated June 7, 1977, discloses that cellulose esters in general may be used in a solvent mixture with oil-modified alkyd resins to form a coating composition. This Defensive Publication deals with solvents for such compositions and does not recognize the unique and surprising results obtained by the use of a particular cellulose ester, cellulose propionate n-butyrate having specifications within a narrow range, in such compositions. In the present invention, there is no dependence upon a special solvent. Conventional solvents may be used and the problem of forming a clear film is solved by the use of a narrowly defined cellulose ester with the alkyd resin.

In accordance with the present invention, unexpected film clarity, and other desirable physical properties, are obtained using a particular cellulose propionate n-butyrate blended with an oil-modified alkyd resin in solution.

It is therefore an object of the present invention to provide cellulose propionate n-butyrate having properties which make it particularly suitable for use in blending with an oil-modified alkyd resin to form a coating composition.

It is another object to provide a coating composition having good physical properties, especially good clarity.

Other objects will appear hereinafter.

The cellulose propionate n-butyrate of the present invention is cellulose propionate n-butyrate having a n-butyryl content of between about 3% and about 5%, a propionyl content of between about 40% and about 50% and a hydroxyl content of between about 2% and 3.0%. Viscosity of the cellulose propionate n-butyrate is between about 0.1 second and about 5 seconds. This cellulose ester may be made using well known esterification techniques in which the cellulose is contacted with a mixture containing propionic acid (a solvent for the reactants and reaction products), propionic anhydride, and n-butyric anhydride with sulfuric acid as esterification catalyst. The amount of n-butyryl groups in the cellulose propionate n-butyrate mixed esters is conveniently controlled by the amount of n-butyric anhydride used in the reaction solution. After esterification is completed, the ester is hydrolyzed in solution according to standard hydrolysis techniques to about 2 to 3 weight percent free hydroxyl groups. Propionyl, n-butyryl and hydroxyl contents are by weight, measured by ASTM D-817-62. Viscosity of the cellulose ester is measured in accordance with ASTM D-1343.

To provide a cellulose ester as specified herein, the quantities of propionic anhydride and n-butyric anhydride should be within the following ranges: propionic anhydride —75 to 85%, and n-butyric anhydride— 15 to 25%, based on the total weight of anhydrides.

Oil-modified alkyd resins useful in the coating composition of the present invention are commercially available. The polyhydric alcohols that are normally employed in the production of alkyd resins of the invention may be any one or more of a number of polyhydric alcohols having 2 to 40 carbon atoms and up to six or more hydroxyl radicals. Suitable polyhydric alcohols which can be employed include ethylene glycol, 1,5-pentanediol, glycerol, trimethylolethane, trimethylolpropane, trimethylolbutane, hexanetriol and butanetriol; pentaerythritol, polypentaerythritol including dipentaerythritol and tripentaerythritol, diglycerol, tetramethylol cyclohexanol, sorbitol, mannitol, inositol, trimethylolphenyl methane, trihydroxymethylaminomethane, etc.

The polybasic carboxylic acid employed in the production of the alkyd resin can be any of a number of polybasic acids having four to 40 carbon atoms and two to four carboxy radicals, preferably a dibasic carboxylic acid or mixture of dibasic carboxylic acids. The aromatic dicarboxylic acids such as the phthalic acids are especially useful acids for the production of alkyd resins for the present invention. Isophthalic acid is also useful. It is preferred that the alkyd resin used in accordance with this invention have a phthalic anhydride content of from about 10% to about 50%. Oil-modified alkyd resins having a vegetable oil content of up to about 70% by weight of the oil-modified alkyd resin may be used, but an oil content of about 20% to about 40% by weight is preferred. The vegetable oils are typically castor, coconut, cottonseed, soybean, etc. Molecular weights of the oil-modified alkyd resins may range between about 1500 and about 4000. A preferred molecular weight is around 2200. Oil-modified alkyd resins and their preparation are discussed generally in *Encyclopedia of Chemical Technology*, Kirk-Othmer, Volume 1, by the Interscience Encyclopedia, Inc. (1947).

A mixture of solvents should be used because those which are good solvents for oil-modified alkyd resins are generally not good solvents for cellulose esters and vice versa. Preferred combinations include two or more solvents blended, including one or more aromatic hydrocarbons, one or more alcohols, and one or more ketones or esters. Aliphatic hydrocarbons may be used as diluents if desired. Aromatic hydrocarbons are good solvents for oil-modified alkyd resins and, when used in combination with alcohols, for cellulose esters. Aromatic hydrocarbons useful in this invention include those having boiling points of from about 80° C. to about 150° C., such as benzene, toluene, xylene, ethyl benzene, divinyl benzene, styrene monomer, chlorostyrene, etc. Aromatic hydrocarbon solvents are inexpensive, but their use as solvents in coating compositions has been somewhat restricted by environmental protection rules.

Alcohols having carbon atom contents of 1 to 8 are useful solvents in the solvent mixtures of this invention. Ethanol, propanol, and butanol are especially preferred alcohols.

Oxygenated active solvents such as ketones and esters are solvents for cellulose esters and are preferably used in the solvent mixtures of this invention. Ketones of 3 to 6 carbon atoms such as acetone, methyl ethyl ketone, methyl isobutyl ketone, etc., are useful. Alternately, low boiling esters such as isobutyl acetate, ethyl acetate, isopropyl acetate and n-propyl acetate may be used.

It is sometimes desirable to dilute the solvent mixture with one or more aliphatic hydrocarbons having from 5 to 40 carbon atoms. Examples of such aliphatic hydrocarbons include pentane, hexane, cyclohexane, and higher paraffins by such trade names as VM & P Naphtha. Aliphatic hydrocarbons are not solvents for either the oil-modified alkyd resins or the cellulose esters, but merely act as inexpensive diluents.

The oil-modified alkyd resin is usually supplied in xylene at 60% (wt.) nonvolatiles. It is dissolved in the selected solvent mixture to give a final percent nonvolatiles of about 20% to about 30 wt. percent. Dissolution of the alkyds is achieved without difficulty and in all solvents containing aromatic hydrocarbons gives solvents free of haze or turbidity.

Similarly, the cellulose ester is dissolved in the selected solvent blend, matching the solvent blend of the oil-modified alkyd resin to be tested, to give a percent nonvolatiles of about 20% to about 30%. These solutions are also free of haze.

Concentrations of cellulose ester may range from about 5% to about 95% by weight based on the combined weight of the cellulose ester and oil-modified resin (based on total solids). Likewise, concentrations of oil-modified alkyd resins may range from about 5% to about 95% by weight based on the combined weight of the cellulose ester and oil-modified alkyd resin. A ratio of 50% by weight of cellulose ester and 50% by weight of oil-modified alkyd resin is preferred.

The coating composition described herein may be blended with a wide variety of modifying ingredients in order to enhance one or more coating properties. Modifiers include plasticizers, maleic and phenolic hard resins, cross-linking agents, rosin esters and ester gums, stabilizers, dyes and pigments in suitable quantities.

The coating compositions according to this invention may be applied to suitable substrates such as, for example, wood, metal, plastics, cloth, paper, and leather by conventional means such as by brushing, spraying, dipping, and the like.

The examples which follow are submitted for a better understanding of the invention.

EXAMPLE 1

Cellulose, one part, is slurry activated in hot water (about 65°–70° C.) and dehydrated with propionic acid. To the activated cellulose (about 3 parts propionic acid retained) is added 4 parts total propionic and n-butyric anhydride containing 0.03 part concentrated sulfuric acid (n-butyric anhydride is varied from zero to 100 weight percent of total to obtain the composition of Examples 2–13). Sufficient propionic acid is added to the mixture to give a 10:1 (total liquid: cellulose) ratio. After esterification is complete, sufficient water is added to destroy the excess anhydrides and to provide 15 weight percent (based on liquids) water for hydrolysis of the ester. Samples of ester are removed after different durations of hydrolysis to give from about 1 to 3 weight percent free hydroxyl groups.

After thorough washing and drying, the cellulose esters are dissolved along with the desired oil-modified alkyd resin at 2/1, 1/1, and 1/2 w/w cellulose ester/alkyd resin ratios at 20 weight percent nonvolatiles in a lacquer solvent comprised of 40% toluene, 30% methyl isobutyl ketone, 20% methyl ethyl ketone, and 10% ethanol. Viscosity of the esters is 0.5 seconds. Approximately 20 mil thick wet films are drawn down on glass plates, air dried, and cured 24 hours at 48–50° C. The clarity of the cured films is rated at 10=clear, 9=very slight haze, 8=slight haze, 7=moderate haze, 6=much haze, ≦5=opaque. The following table of examples shows the effect of cellulose propionate n-butyrate hydroxyl content and n-butyryl content on film clarity with coconut oil modified alkyd resins.

Table 1

| Example | n-Butyric Anhydride in Reaction Bath, % of Total | Cellulose Ester Analysis | | | Film Clarity Rating of Cellulose Ester/Alkyd Resin, w/w | | |
|---|---|---|---|---|---|---|---|
| | | wt % n-Butyryl | wt % Hydroxyl | wt % Propionyl | 2/1 | 1/1 | 1/2 |
| 2 (Control) | 0 (cellulose propionate) | <1.0 | 2.69 | 44.5 | 10 | 7–8 | <5 |
| 3 | 15 | 3.3 | 0.98 | 46.0 | 6 | <5 | <5 |
| 4 | 15 | 3.5 | 2.4 | 43.6 | 10 | 8–9 | |
| 5 | 15 | 3.5 | 2.6 | 43.7 | 9 | 8–9 | |
| 6 | 25 | 5.2 | 2.40 | 42.0 | 10 | 9 | |
| 7 (Control) | 50 | 11.5 | 1.38 | 38.6 | 7 | <5 | <5 |
| 8 (Control) | 50 | 8.6 | 1.78 | 38.8 | 7 | <5 | <5 |
| 9 (Control) | 50 | 8.5 | 2.80 | 37.5 | 8 | 7 | 6–7 |
| 10 (Control) | 75 | 14.0 | 2.22 | 35.3 | <5 | <5 | <5 |

Table 1-continued

| Example | n-Butyric Anhydride in Reaction Bath, % of Total | Cellulose Ester Analysis | | | Film Clarity Rating of Cellulose Ester/ Alkyd Resin, w/w | | |
|---|---|---|---|---|---|---|---|
| | | wt % n-Butyryl | wt % Hydroxyl | wt % Propionyl | 2/1 | 1/1 | 1/2 |
| 11 (Control) | 100 | 25.8 | 2.34 | 17.3 | <5 | <5 | <5 |
| 12 (Control) | (cellulose n-butyrate) | 53.0 | 1.72 | <1.0 | 6-7 | <5 | <5 |
| 13 (Control) | (cellulose n-butyrate) | 46.6 | 4.5 | <1.0 | <5 | <5 | <5 |

From the film clarity values given in Table I, it is seen that less than about 3% by weight (or cellulose propionate) butyryl (Example 1) results in a very low film clarity rating when the ratio of cellulose ester to alkyd is 1:2. The film clarity in Example 3 is poor because the hydroxyl content is less than about 2% by weight of ester. Examples 4–6 illustrate the good film clarity obtained when the propionyl, n-butyryl and hydroxyl contents are within the range specified herein. Examples 7–13 illustrate the progressively poorer film clarity as these ranges are deviated from. Other important properties of the films in Examples 4–6 such as aesthetic appeal, hardness, adhesion, toughness and durability were good.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. Cellulose propionate n-butyrate having, by weight, from about 3 to about 5% butyryl content, from about 40 to about 50% propionyl content, and from about 2% to about 3% free hydroxyl content.

2. A coating composition comprising
   (a) from about 5% to about 95% by weight, based on non-volatiles, of cellulose propionate n-butyrate having an n-butyryl content of between about 3 and about 5%, a propionyl content of between about 40 and about 50% and a hydroxyl content of between about 2 and 3%,
   (b) from about 95% to about 5% by weight, based on non-volatiles, of an oil-containing alkyd resin having a molecular weight of from about 1500 to about 4000, and
   (c) a solvent in an amount sufficient to provide said coating composition with a non-volatile content of from about 20% to about 30% by weight.

3. A substrate having applied to a surface thereof the coating composition of claim 2.

4. A coating composition comprising
   (a) from about 5% to about 95% by weight, based on non-volatiles, of cellulose propionate n-butyrate having an n-butyryl content of between about 3 and about 5%, a propionyl content of between about 40 and about 50% and a hydroxyl content of between about 2 and 3%,
   (b) from about 95% to about 5% by weight, based on non-volatiles, of an oil-containing alkyd resin having a molecular weight of from about 1500 to about 4000, and
   (c) a solvent in an amount sufficient to provide said coating composition with a non-volatile content of from about 20% to about 30% by weight.

5. Coating composition according to claim 2 wherein the coating composition comprises between about 30 and about 70% of said cellulose propionate n-butyrate and between about 70 and about 30% of said oil-containing alkyd resin.

6. A substrate having applied to a surface thereof the coating composition of claim 4.

* * * * *